United States Patent [19]
Fischer

[11] Patent Number: 5,934,988
[45] Date of Patent: Aug. 10, 1999

[54] METHOD AND APPARATUS FOR MOTOR VEHICLE HEATING AND AIR-CONDITIONING

[76] Inventor: Carl John Fischer, 10259 N. 1000, E. Cromwell, Ind. 46732

[21] Appl. No.: 08/901,516

[22] Filed: Jul. 28, 1997

[51] Int. Cl.⁶ ..................................................... B60H 1/26
[52] U.S. Cl. ............................ 454/121; 454/93; 454/156
[58] Field of Search .................................. 454/87, 93, 99, 454/100, 121, 139, 144, 156

[56] References Cited

U.S. PATENT DOCUMENTS

| | | | |
|---|---|---|---|
| 2,203,814 | 6/1940 | Clements | 454/100 |
| 2,655,092 | 10/1953 | Spooner | 454/93 |
| 4,762,169 | 8/1988 | Andersen et al. | 454/121 X |
| 5,673,964 | 10/1997 | Roan et al. | 454/121 X |

FOREIGN PATENT DOCUMENTS 1 003 057  2/1957  Germany .................................. 454/99

*Primary Examiner*—Harold Joyce
*Attorney, Agent, or Firm*—Ryan M. Fountain

[57] ABSTRACT

A heating and air conditioning system for a motor vehicle includes a plenum supplied with air by each of a pair of variable speed blowers. A set of heating and air conditioning ducts extend from the plenum to the drivers side of the vehicle, and another set of heating and air conditioning ducts extend from the plenum to the passengers side of the vehicle. Accordingly, both the driver and the passenger can control the blower supplying air to the ducts on the corresponding side of the vehicle. A defrosting duct extends from the plenum to supply defrosting air to the windshield of the vehicle. One of the blowers normally supplies air to the defrosting duct, but the volume and velocity of air may be "boosted" by optional use of the other blower.

20 Claims, 6 Drawing Sheets

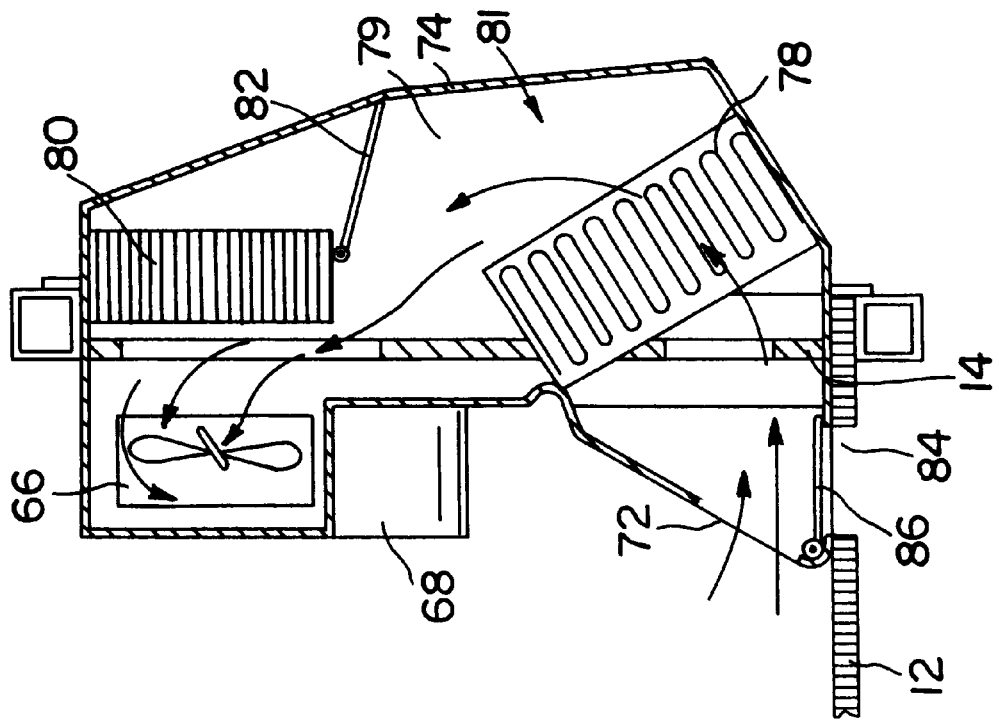
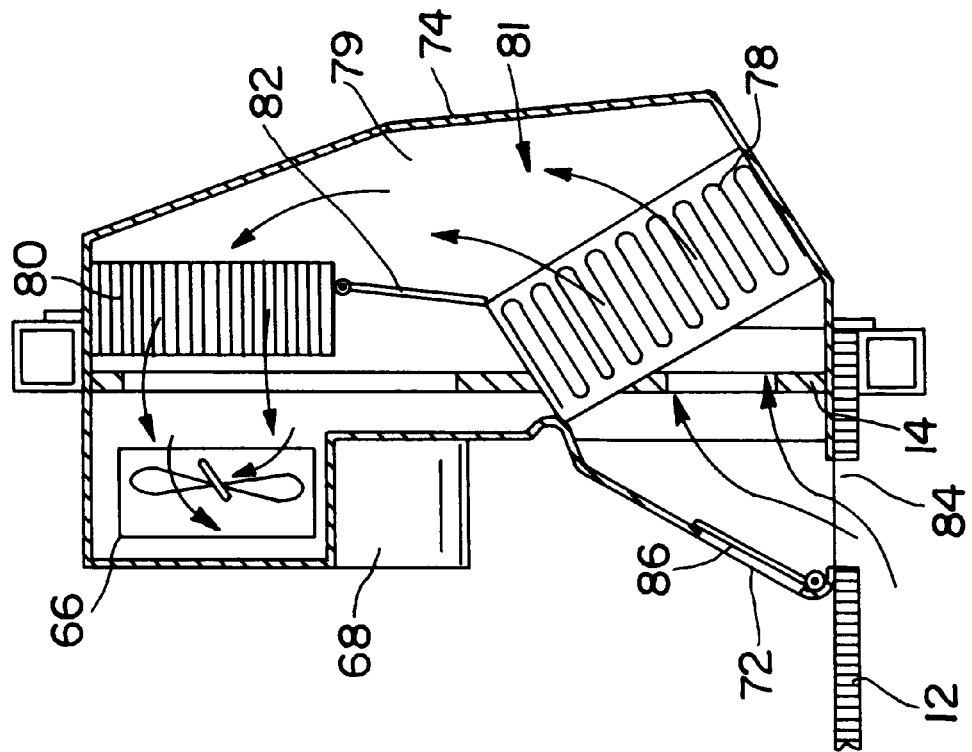

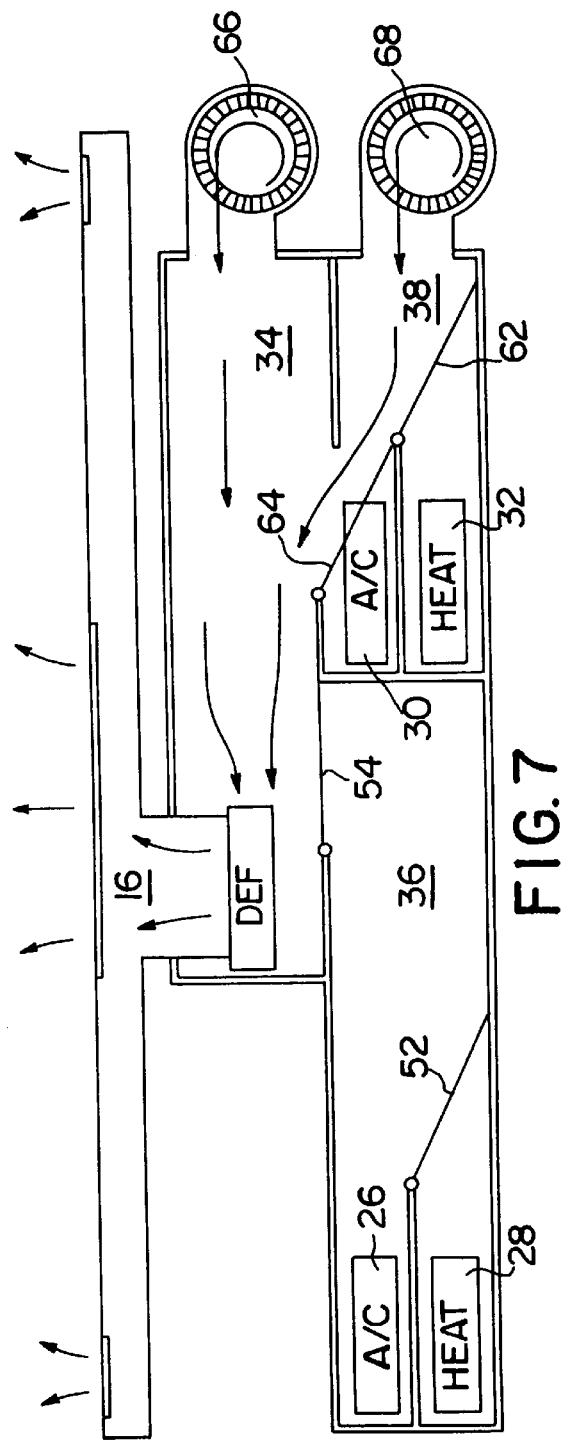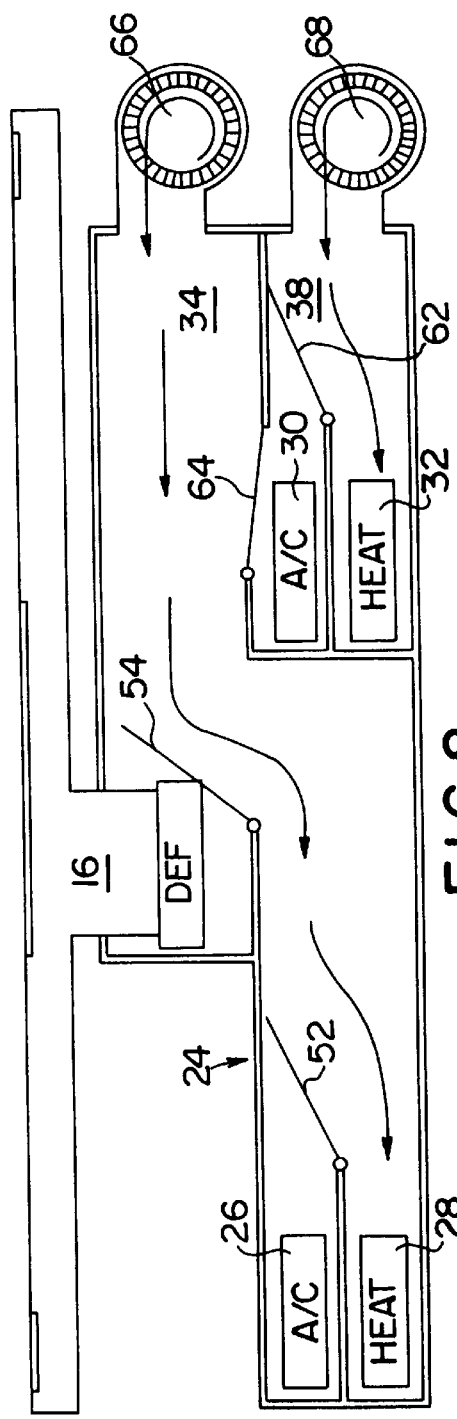

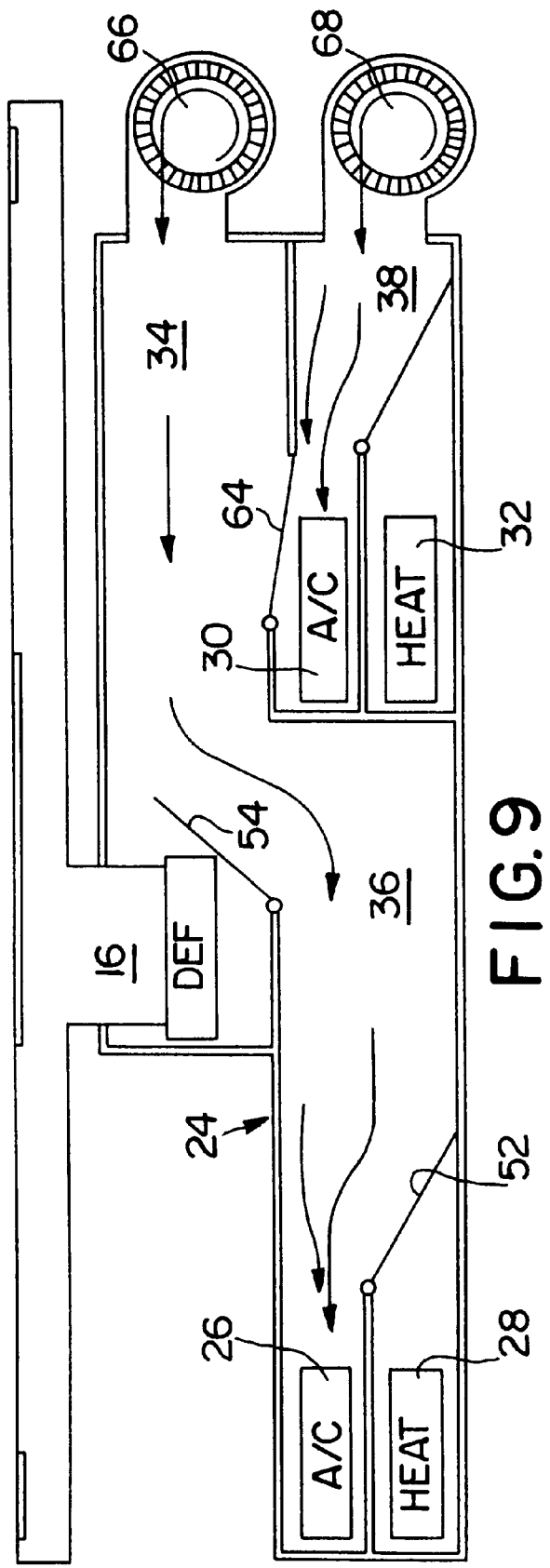

METHOD AND APPARATUS FOR MOTOR VEHICLE HEATING AND AIR-CONDITIONING

BACKGROUND AND SUMMARY OF THE INVENTION

This invention relates to heating and air conditioning systems for motor vehicles, particularly vehicles having a relatively wide passenger compartment.

Large motor vehicles, such as motor homes and other similar recreational vehicles, have been provided with a front driver's seat and a front passenger seat that are separated by the engine cowling. Accordingly, the distance between the two seats may be substantial. Prior heating and air conditioning systems have employed a single control arrangement for both seats, if not the entire vehicle. However, at any given time either the driver or the passenger may be too hot while the other is too cold, particularly if the vehicle is being driven in the early morning or late afternoon when the sun is shining more through the windows on one side of the vehicle. The only recourse typically available to the passenger and driver is separate control of vents from the common ducting. However, this has not provided the most convenient and efficient climate control since the ducting to both sides of the vehicle still receives a volume of blown air and closing the vents on one side of the vehicle affects the air flow at the other side. Thus, vent adjustment can require subsequent corresponding blower adjustment. Some prior systems have included separate structures and control arrangements for the rear passenger area of the vehicle, but again lateral differentiation in the climate control has not been available. Spacial constraints and weight minimization are important factors in vehicle design and have prohibited elaborate constructions of climate control systems found in static structures.

Furthermore, such vehicles are often equipped with extremely large windshield areas. To effectively provide warm air for defrosting the entire windshield in an acceptable period of time, a significantly larger volume and/or velocity of air may on occasion need to be provided than would normally be needed for passenger climate control. That larger volume of air could be achieved by using a larger blower, but in doing so there would be spacial and cost inefficiencies.

Accordingly, it is an object of the present invention to provide an improved heating and air conditioning system for use in motor vehicles. Other objects include the provision of:

1. an efficient and compact ducting system for air flow in a vehicle climate control arrangement,
2. a system which permits independent lateral control of heating and air conditioning in a vehicle,
3. an efficient vehicle windshield defrosting and defogging system that requires minimal space and operating costs, and
4. a vehicle climate control system that permits simultaneous and independent operation of heating and air conditioning functions.

These and other objects of the present invention are achieved by the provision of a heating and air conditioning system for motor vehicles in which a pair of blowers are controlled to supply air independently to separate lateral ducts or in tandem to the windshield ducts. One blower provides either heated or cooled air to the driver's side of the vehicle, and the other blower provides heated or cooled air to the passenger side of the vehicle. The blowers force air through heating and air conditioning coils and into a plenum. Control damper doors in the plenum control distribution of air between the driver and passenger sides of the vehicle. The individually adjusted blowers enable both the driver and passenger to adjust the heating or cooling on their corresponding side of the vehicle. During a window defrost or defog cycle, a single blower motor may be used to force air onto the windshield area of the vehicle, but a second blower motor may also be used to "boost" the quantity and velocity of the air distributed across the windshield such that the entire windshield area is more quickly covered by the defrost or defog air.

Other objects, advantages and novel features of the present invention will become apparent from the following detailed description, with reference to the accompanying drawings.

BRIEF DESCRIPTION OF THE DRAWINGS

FIG. 3 is a cross sectional view taken substantially along lines 3—3 of FIG. 1, and illustrating the system in the heating mode;

FIG. 4 is a view similar to FIG. 3, but illustrating the system in the air conditioning mode;

FIGS. 6–9 are views similar to FIG. 5 but illustrating the positions of the various components within the plenum during the various modes of operation of the system.

DESCRIPTION OF PREFERRED EMBODIMENTS

Figure 1:
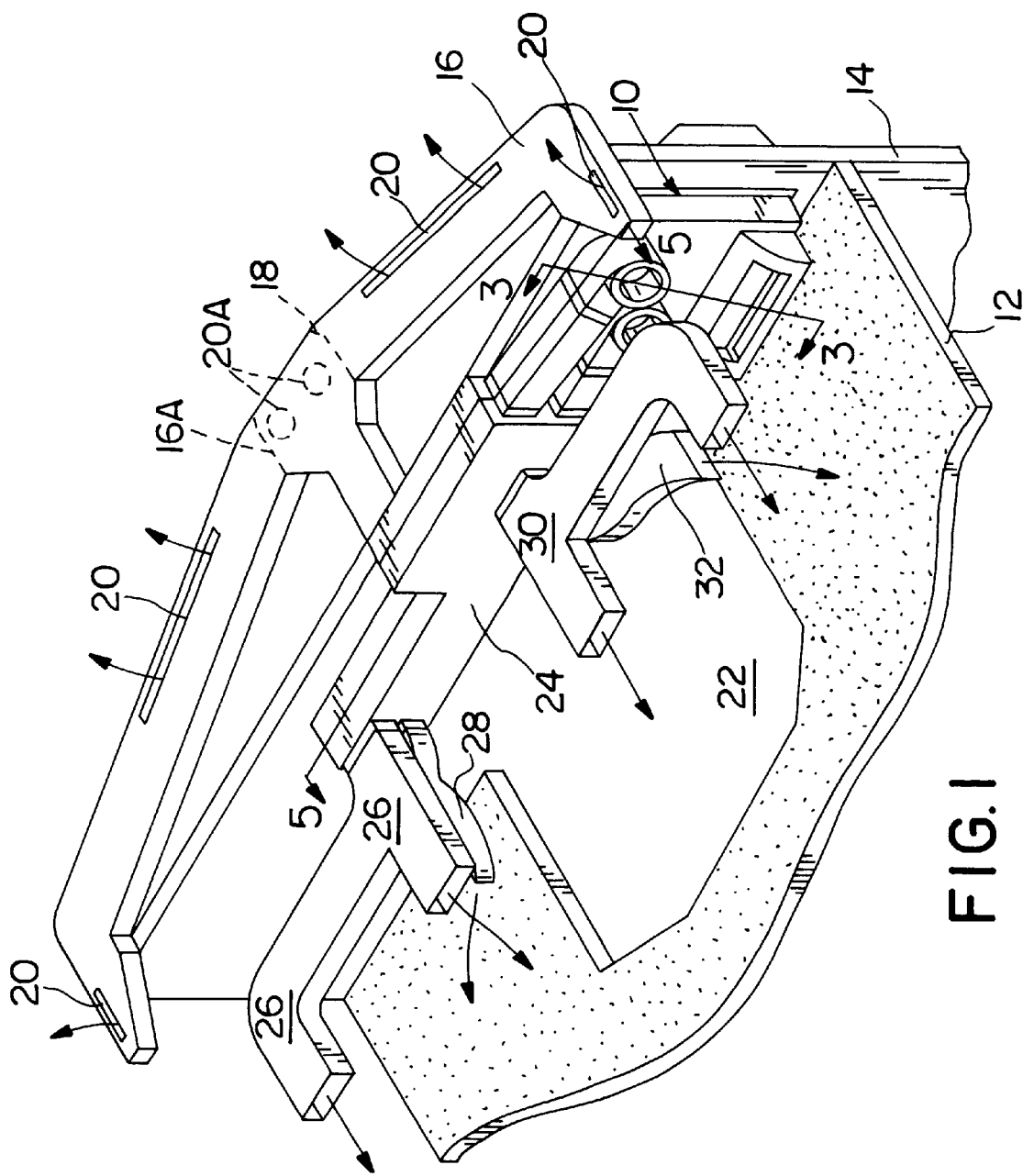
FIG. 1 is a view in perspective of the front portion of the passenger area of a motor vehicle using the heating and air conditioning system of the present invention, with the bottom panels, seat, engine, and dashboard and windshield removed.
Figure 2:
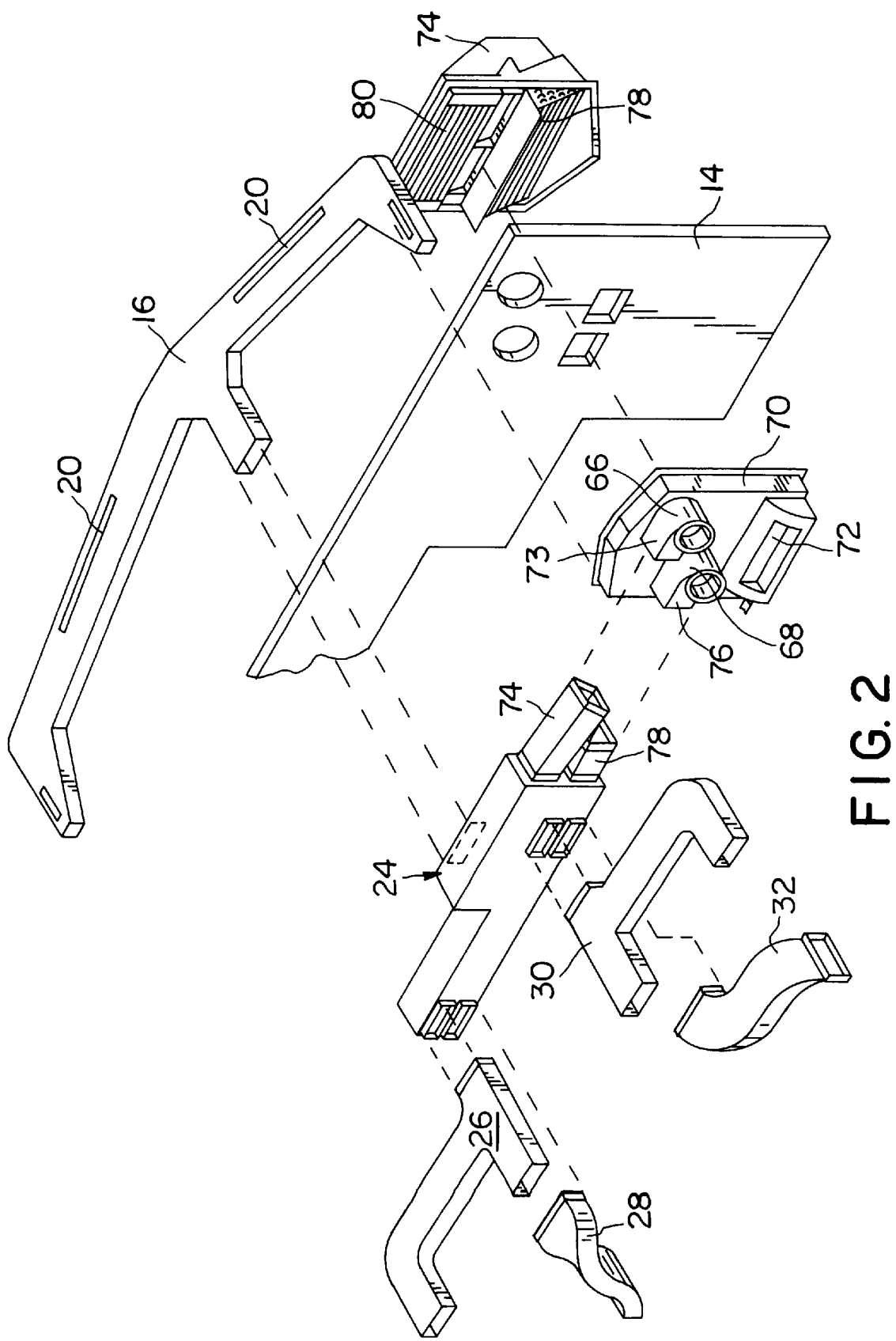
FIG. 2 is a view similar to FIG. 1, but illustrating the various components of FIG. 1 exploded away from one another.

Referring now to the drawings, which illustrate a preferred embodiment of the present invention, the heating and air conditioning system generally indicated by the numeral 10 is installed on a vehicle, such as a motor home or similar recreational vehicle. The vehicle typically includes a floorboard, the forward portion of which is illustrated 12, a front vertical bulkhead 14, and a defrosting duct 16 and forward edge 18 of which adjoins the vehicle windshield (not shown). Accordingly, a defrosting duct 16 is preferably provided with defroster openings 20 through which defrosting air is forced against the windshield and adjoining side windows (not shown) when the heating and air conditioning system 10 is operated in the defrosting mode. The floorboard 12 includes a cutaway portion 22 which accommodates the vehicle engine and engine cowling.

As an alternative to the extended structure of duct 16, especially preferred embodiments can include a shortened defrosting duct 16A, the ends of which are shown in dashed lines in FIG. 1, directed to the lower central portions of the windshield. Defroster openings 20A are provided in duct 16A to permit air to be forced against the windshield.

The heating and air conditioning system 10 includes an air distributing plenum 24 which is mounted on the vertical bulkhead 14. Driver's side air conditioning ducts 26 and a drivers side heating duct 28 extend from the plenum 24. Similarly, passenger side air conditioning ducts 30 extend from the plenum 24, as does a passenger side heating duct 32. In alternative embodiments, hoses of a conventional nature can be employed to serve the function of ducts 30.

Figure 5:
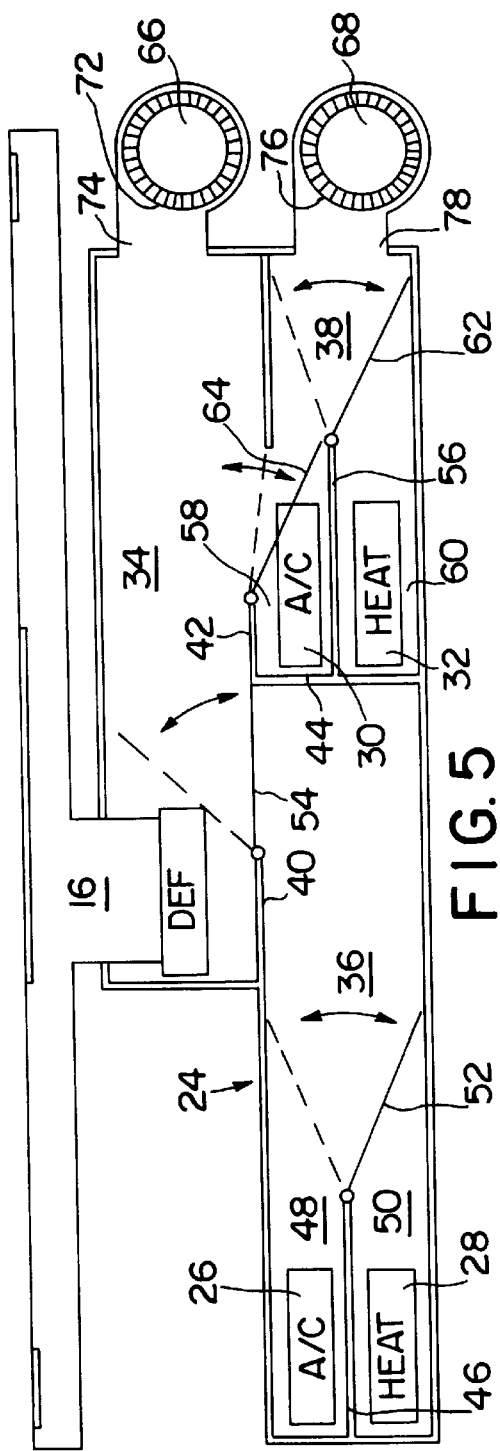
FIG. 5 is a view taken substantially along 5—5 of FIG. 1.

Plenum 24 is formed into a defrosting section 34, a driver's side distribution section 36, and a passenger side distribution section 38 by dividing walls 40, 42, and 44. A dividing wall 46 divides the section 36 into an air conditioning section 48 communicated to air conditioning duct 26 and a heating section 50 communicated with heating duct 28. A damper door 52 is movable between the solid and dashed positions to control communication from section 36 to either section 48 or section 50. Similarly, the other damper door 54 is movable from the solid position in FIG. 5 closing off section 36 from section 34, to the dashed position opening communication from section 34 into section 36, but closing off communication to defrost duct 16. A dividing wall 56 within section 38 of plenum 24 divides section 38 into a section 58 communicated with the air conditioning ducts 30 and a section 60 communicating with passenger side heating duct 32. A damper door 58 is pivotable between the solid and dashed positions to communicate section 38 with either air conditioning section 58 or heating section 60. Still another damper door 64 is movable between the solid line position communicating section 38 with section 34 to the dashed position closing off communication between section 38 and section 34. All of the damper doors 52, 54, 62, 64 can, for example, be operated by conventional servo mechanisms in response to operation of appropriate control mechanisms (not shown) mounted on the dashboard of the vehicle. Since actuation of the damper doors in this matter can be conventional, no more detailed description will be given herein.

A pair of centrifugal, variable speed blowers 66, 68 are, for example, mounted on a cover plate 70 which is secured to bulkhead 14. An outlet 73 of the blower 66 is in communication with section 34 of plenum 24 through a transition duct 74, and outlet 76 of blower 68 is communicated to section 38 through a transition duct 78. Alternatively, the blower outlets 73 and 76 can be connected directly to plenum 24 in embodiments where plate 70 is secured to bulkhead 14 at a location closer to plenum 24.

In especially preferred embodiments, a recirculating air inlet opening 72 is provided in cover 70 for admitting air from within the vehicle through cover 70. Cover 70 closes the opened end of a coil housing 74 which is mounted on bulkhead 14 opposite cover 70. A set of air conditioning coils 78 and a set of heating coils 80 are located within housing 74 in a flow path generally indicated by the numeral 81 which extends between inlet 72 and blowers 66, 68. A damper door 82 is pivotally mounted within flow path 81 and is movable from the position illustrated in FIG. 3 in which air is communicated through both cooling coils 78 and heating coils 80 to the position illustrated in FIG. 4 in which damper door 82 shuts off flow through heating coils 80 forcing the air to bypass heating coils 80. Door 82 in the FIG. 3 position provides heat to the passenger compartment, since when door 82 is in the FIG. 3 position the flow of coolant to coils 78 will be cut off in response to the operation of the aforementioned control on the vehicle dashboard, in a manner which can be readily known to those skilled in the art. However, when door 82 is in the FIG. 4 position, coolant is admitted to coils 78 for the purpose of cooling the air and providing air conditioning to the passenger compartment. Ambient air, that is, air from outside the vehicle is admitted to flow path 81 through an opening 84 in floorboard 12. A damper door 86 is pivotally connected on cover 70 and is pivotable from the FIG. 3 position in which ambient air is admitted from outside the vehicle through the opening 84 into flow path 81 to the FIG. 4 position in which opening 84 is closed and air is recirculated from the interior of the vehicle through opening 72.

In embodiments where it is desired to permit either the driver or the passenger to have air conditioning while the other has heat, a dividing wall 79, such as a conventional vertical metal plate, can be mounted in system 10 to vertically bisect air flow path 10 and permit cooling coils 78 on one side to operate independently from heating coils 80 on the other side.

In operation, and referring to FIG. 8, plenum 24 is configured to allow heating of the interior of the motor vehicle. Accordingly, damper door 54 is positioned to shut off air conditioning duct 16 and to allow blower 66 to force air into heating duct 28, damper door 52 having been positioned to shut off air conditioning duct 26. Similarly, blower 68 forces heated air through heating duct 32 to the passenger side of the vehicle, door 64 having been positioned to shut off air conditioning duct 30 and door 64 having been positioned to shutoff compartment 38 from compartment 36. Door 82 is positioned as illustrated in FIG. 3, to provide for heated air to be drawn through heating coils 80 by blowers 66 and 68. Accordingly, the driver can adjust the speed of blower 66 to provide the quantity of heated air through the driver's side heating ducts 28 this is comfortable to the driver, while the passenger can separately adjust the speed of blower 68 to provide the quantity of air through heating ducts 32 that is comfortable to the passenger. It will be remembered that blower 66 and 68 draw the heated air through the flow path 81 and through a common set of heating coils 80. Furthermore, damper 86 may be positioned in the FIG. 3 position to allow outside air to be used for heating, or may be position in the FIG. 4 positioned to permit recirculation of heated air through the passenger compartment.

When air conditioning is desired, door 82 is positioned in the FIG. 4 position, allowing air cooled by cooling coils 78 to be made available to blowers 66 and 68. Referring to FIG. 9, which illustrates a configuration of the plenum 24 in which air conditioning is provided to the passengers, door 54 is positioned as shown in FIG. 8 to shut off defrost duct 16, door 52 is positioned to shut off heating duct 28 and to open air conditioning ducts 26 to section 36 of plenum 24, thereby allowing cooled air to be communicated to the driver's side of the vehicle through air conditioning duct 26. Similarly, damper door 64 is positioned in the position illustrated in both FIG. 8 and FIG. 9 in which section 36 is shut off from section 38. Damper door 64, however, is positioned as illustrated in FIG. 9, shutting off heating duct 32 and opening air conditioning duct 30 to blower motor 68 to provide cooled air to the passenger side of the vehicle through ducts 30. Again, both the driver and passenger can individually adjust the speed of corresponding blower 66 or 68 thereby providing the quantity of cooled air required by either passenger to maintain either the driver or the passenger in comfort. It will be noted, however, that the passenger and the driver can, in especially preferred embodiments, both be provided with heated air or both provided with air conditioned air. In an alternative arrangement, as, for example, where spacial constraints in the vehicle permit additional structure or where, for example, wall 79 is employed, the driver and passenger can each be provided with their choice of heat or air conditioning, independently of the choice made by the other party.

Figure 6:
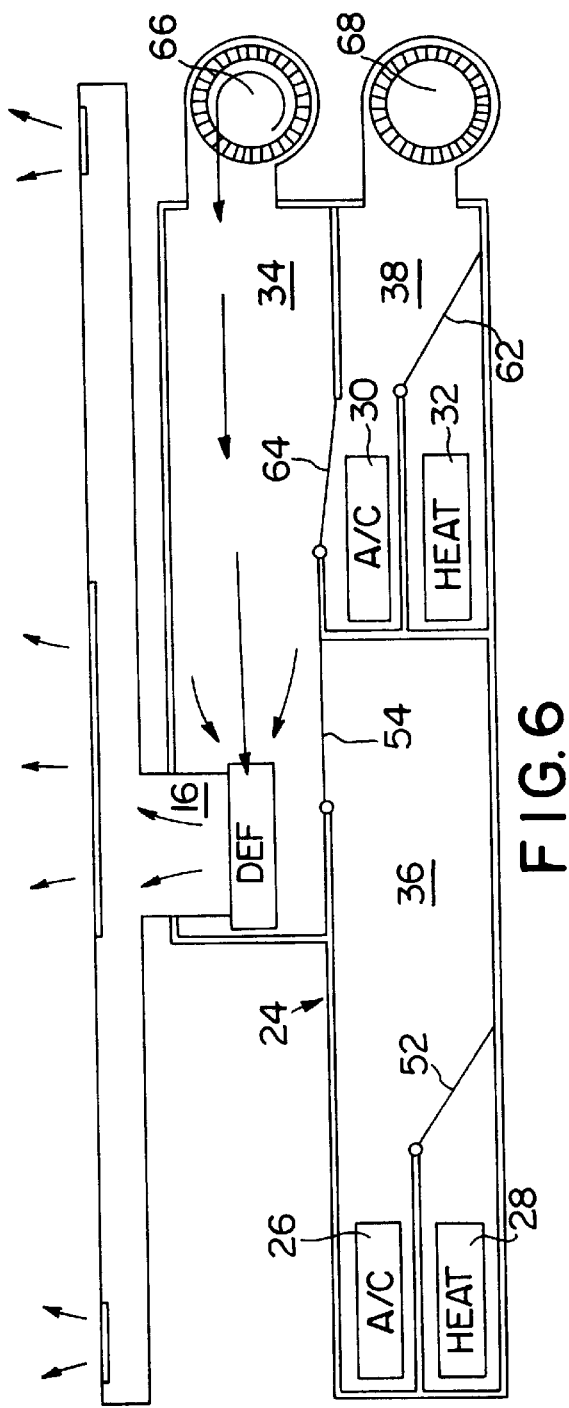

FIG. 6 illustrates the configuration of plenum 24 when the system is operated in a normal defrost mode to supply defrosting air through apertures 20 against the windows of the vehicle. In this configuration, damper door 54 is moved to the position illustrated in FIG. 6, thereby shutting off section 34 from section 36 an opening communication from section 34 into the defrost duct 6. Damper door 64 is positioned to shutoff section 34 from section 38. Accordingly, blower 68 will be turned off and blower 66 will be used to force air through coils 78 and 80, through section 34 plenum 24 and into defrost ducts 16. There can be situations, however, when it is necessary or desirable to force air in substantial quantities at a substantial velocity through defrost duct 16 and opening 20 to quickly defrost the windshield of the vehicle. Accordingly, system 10 can be operated in a "defrost boost" mode in which both of blower motors 66 and 68 are used to force defrost air through duct 16. In this situation, damper doors 64 and 62 are positioned as illustrated in FIG. 7, to close off air conditioning ducts 30 and heating duct 32. Damper door 54 closes off air conditioning ducts 26 and heating duct 28. Accordingly, section 38 of plenum is communicated to section 34, thereby permitting both blower 66 and blower 68 to force air through section 34 and into defrost duct 16, thereby supplying defrost air to the windshield in substantial quantities and at substantial velocity sufficient to quickly defrost the windshield.

Although the present invention has been described above in detail with respect to particular embodiments, the same is by way of illustration and example only and is not to be taken as a limitation. The spirit and scope of the present invention are limited only by the terms of the following claims.

What I claim is:

1. Climate control system for a passenger vehicle, said system having a plenum, multiple sets of ducts extending from said plenum, each set of ducts being directed to a different area of the vehicle, an independently controlled variable speed blower for each set of ducts, and control means within said plenum for controlling the flow of air through each of said ducts.

2. Climate control system as claimed in claim 1, wherein said control means is movable between a position selecting one duct of each set and another position selecting another duct of each set, one of said blowers controlling the velocity of air in the selected duct of one of said sets, the other blower controlling the velocity of air in the selected duct of the other set independently of the velocity of the air in the selected duct of the one set.

3. Climate control system as claimed in claim 2, wherein said one duct of each set is an air conditioning duct and the other duct of each set is a heating duct.

4. Climate control system as claimed in claim 2, wherein a window defrosting duct extends from said plenum to defrost windows of said motor vehicle, said control means being shiftable between a position closing said defrosting duct and a position connecting one of said blowers to said defrosting duct.

5. Climate control system as claimed in claim 4, wherein said control means is movable to a position connecting both said one blower and the other blower to said defrosting duct to thereby boost the air communicated through said defrosting duct.

6. Climate control system as claimed in claim 2, wherein said blowers each include an inlet and an outlet, said outlet of each of said blowers being communicated to said plenum, the inlet of each of said blowers being communicated to a coil housing defining a flow path extending through heating and air conditioning coils.

7. Climate control system as claimed in claim 6, wherein said flow path extending through the heating and air conditioning coils is common to the inlet of each of said blowers.

8. Climate control system as claimed in claim 7, wherein said blowers are mounted in a cover defining one wall of said coil housing.

9. Climate control system as claimed in claim 8, wherein said vehicle includes a bulkhead, said plenum being mounted on said bulkhead.

10. Climate control system as claimed in claim 1, wherein a window defrosting duct extends from said plenum to defrost windows of said motor vehicle, said control means being shiftable between a position closing said defrosting duct and a position connecting one of said blowers to said defrosting duct.

11. Climate control system as claimed in claim 10, wherein said control means is movable to a position connecting both said one blower and the other blower to said defrosting duct thereby boosting the air communicated through said defrosting duct.

12. Climate control system for a passenger vehicle, said system having a plenum, a window defrosting duct extending from said plenum to defrost windows of said motor vehicle, a pair of blowers for forcing air through said defrosting duct, and control means shiftable between a position closing said defrosting duct, a position connecting one of said blowers to said defrosting duct, and a position connecting both said one blower and the other blower to said defrosting duct to thereby boosting the quantity and velocity of air communicated through said defrosting duct over the quantity and velocity of the air produced by said one blower alone.

13. Climate control system as claimed in claim 12, wherein said blowers each include an inlet and an outlet, said outlet of each of said blowers being communicated to said plenum, the inlet of each of said blowers being communicated to a coil housing defining a flow path extending through heating and air conditioning coils.

14. Climate control system as claimed in claim 13, wherein said flow path extending through the heating and air conditioning coils is common to the inlet of each of said blowers.

15. Climate control system as claimed in claim 14, wherein said blowers are mounted in a cowling defining one wall of said coil housing.

16. Climate control system as claimed in claim 15, wherein said vehicle includes a bulkhead, said cowling and said plenum being mounted on said bulkhead.

17. A climate control system for a multi passenger motor vehicle having opposing side regions therein, comprising:
   a first means for providing cooled air,
   a second means for providing heated air,
   a third means, connected to the first and second means, for transmitting the cooled air or heated air, alternatively to opposing side regions of the vehicle, and
   a fourth means, connected to the third means, for permitting the flow of air by the third means to be independently controlled for each of the side regions.

18. The invention according to claim 17 wherein a fifth means is provided, connected to the fourth means, for selectively overriding the independent control and providing the flow of air for one or both side regions to be directed instead to a windshield region.

19. A climate control system for a vehicle comprising:

a main duct;

multiple sets of ducts extending from the main duct, each set of ducts being directed to a different area of the vehicle;

an independently controlled blower for each set of ducts; and at least one damper within the main duct for controlling the flow of air through each of the ducts.

20. A climate control system for a vehicle, comprising:

a main duct;

a window defrosting duct extending from the main duct;

a pair of blowers for forcing air through the defrosting duct; and a plurality of dampers shiftable between a position closing the defrosting duct, a position connecting one of the blowers to the defrosting duct, and a position connecting both of the blowers to the defrosting duct to boost air volume therethrough.

* * * * *